US008265806B2

(12) United States Patent
Coulmeau et al.

(10) Patent No.: US 8,265,806 B2
(45) Date of Patent: Sep. 11, 2012

(54) METHOD FOR UPDATING METEOROLOGICAL INFORMATION FOR AN AIRCRAFT

(75) Inventors: François Coulmeau, Seilh (FR); Guy Deker, Cugnaux (FR)

(73) Assignee: Thales, Neuilly-sur-Seine (FR)

( * ) Notice: Subject to any disclaimer, the term of this patent is extended or adjusted under 35 U.S.C. 154(b) by 984 days.

(21) Appl. No.: 11/957,239

(22) Filed: Dec. 14, 2007

(65) Prior Publication Data
US 2008/0243319 A1    Oct. 2, 2008

(30) Foreign Application Priority Data
Dec. 15, 2006    (FR) ..................... 06 10956

(51) Int. Cl.
*G06Q 90/00*    (2006.01)
(52) U.S. Cl. ............... 701/14; 340/945; 340/601; 702/3
(58) Field of Classification Search ............... 701/14, 701/301, 400; 340/601, 339, 945, 963, 971, 340/539.28, 973, 968; 342/26; 73/170.01, 73/170.16; 702/3
See application file for complete search history.

(56) References Cited

U.S. PATENT DOCUMENTS

| 6,917,297 | B2 * | 7/2005 | Andrews et al. ............ 340/601 |
| 7,069,147 | B2 * | 6/2006 | Manfred et al. .................. 702/2 |
| 7,109,912 | B1 * | 9/2006 | Paramore et al. ........... 342/26 B |
| 7,109,913 | B1 * | 9/2006 | Paramore et al. ........... 342/26 B |
| 7,612,688 | B1 * | 11/2009 | Vigeant-Langlois et al. 340/971 |
| 2002/0039072 | A1 * | 4/2002 | Gremmert et al. ........... 340/945 |
| 2004/0244476 | A1 * | 12/2004 | Andrews et al. ........... 73/170.01 |

FOREIGN PATENT DOCUMENTS

| EP | 0581659 A1 | 2/1994 |
| EP | 0826946 A1 | 3/1998 |

OTHER PUBLICATIONS

SITA: "Air Traffic Services Datalink—Description and Locations"; AIRCOM.ATS@SITA.AERO,;(Online); Sep. 12, 2006, pp. 1-15, XP002436537.
Raja Parasuraman et al: "A Model for Types and Levels of Human Interaction with Automation" IEEE Transaction on Systems, Man and Cybernetics. Part A: Systems and Humans,. vol. 30, No. 3, May 2000; XP011056321.

* cited by examiner

*Primary Examiner* — Thomas G. Black
*Assistant Examiner* — Marthe Marc-Coleman
(74) *Attorney, Agent, or Firm* — Lowe, Hauptman, Ham & Berner LLP

(57) ABSTRACT

Described is a method of updating meteorological information for an aircraft, which includes automatically providing a request by an on board computer (FMS, flight management system) for the meteorological data so as to anticipate the updating of the latter as soon as an update is available. This automation allows the crew to have the data ready for display and use without waiting, to reduce and smooth the workload of the crew by anticipating the request and the processing of these data, and to limit the potential confusion associated with the receipt, hitherto verbal, of the ATIS (Air Traffic Information Service) information.

4 Claims, 1 Drawing Sheet

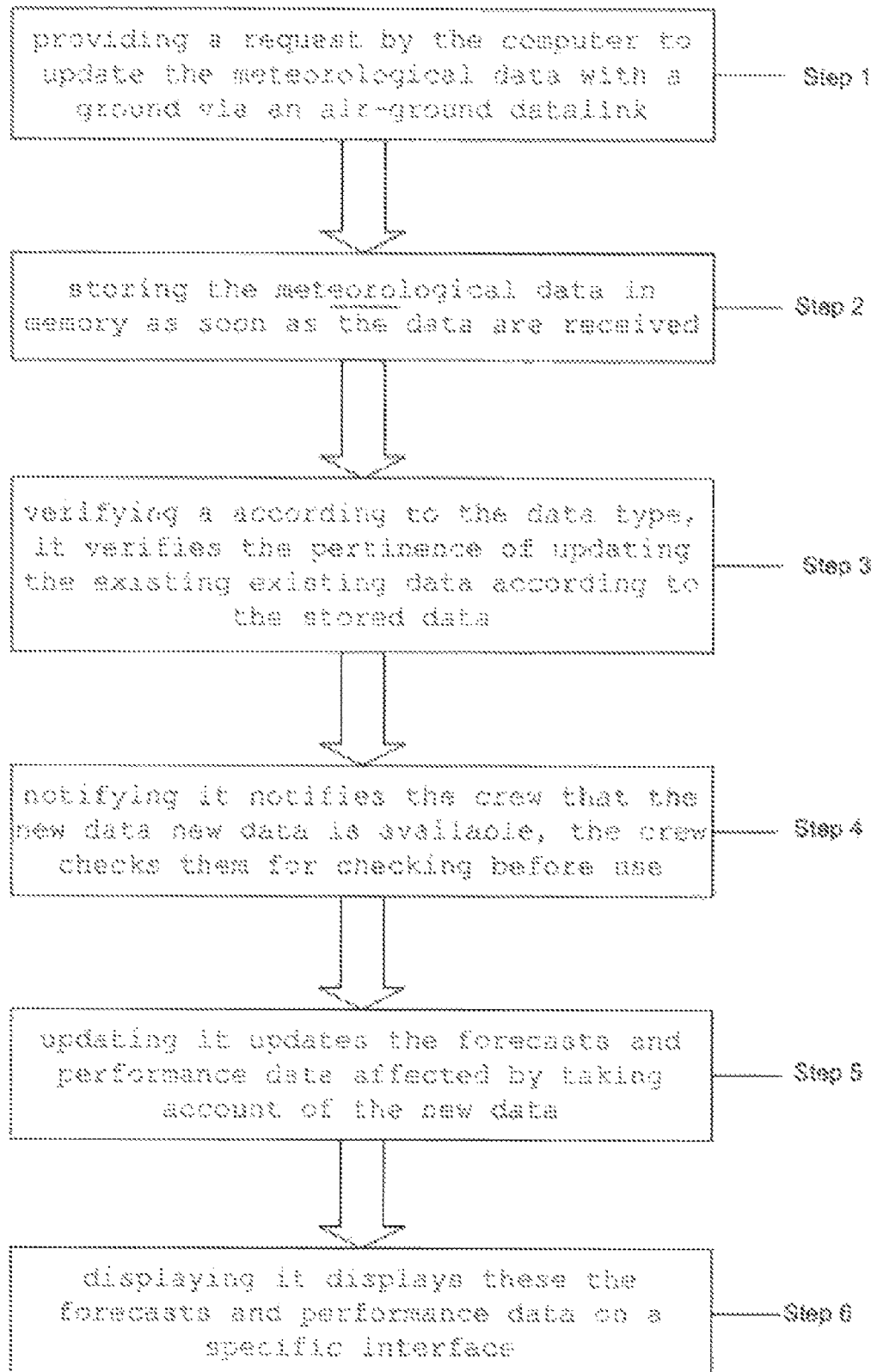

METHOD FOR UPDATING METEOROLOGICAL INFORMATION FOR AN AIRCRAFT

RELATED APPLICATIONS

The present application is based on, and claims priority from, French Application Number 06 10956, filed Dec. 15, 2006, the disclosure of which is hereby incorporated by reference herein in its entirety.

FIELD OF THE INVENTION

The present invention relates to a method for updating meteorological information for an aircraft.

BACKGROUND OF THE INVENTION

In the field of flight management systems (FMS), searching for and updating meteorological information throughout the flight and on arrival and at alternative airports are tasks that are important to the profitability and security of the flight. They are repetitive and relatively awkward tasks that the crew must carry out just before the flight, before starting the descent (to confirm or update the information obtained prior to the flight) and on long-haul flights before passing each decision point to alternative airports.

Before the flight, the crew requests the current meteorological conditions on the route and on the predicted alternatives. The crew requests or listens to the ATIS (Air Traffic Information Service) which gives them the runway in service and the meteorological conditions and the landing procedure in force. Similarly, during a long-haul flight, in particular if it is making an ocean crossing, the crew updates the meteorological conditions for arrival at the alternative airport by requesting them usually via ACARS (Aircraft Communications Addressing and Reporting System) from its airline or other accredited supplier, shortly before arriving at the decision point (the point on the trajectory where the decision is made to divert or to continue). Currently, there is no system in the field of meteorological information, making it possible to reduce the workload of an aircraft crew in the various phases of preparing for a flight or during the flight.

In addition provision is made, in the context of enhancing the accuracy of the weather forecasts for the trajectory, to more frequently update the meteorological data (of the wind, temperature, etc. type), by using the datalink. These loaded data will be greater in number, generating for the crew more difficulties and time to analyse them and load them.

SUMMARY OF THE INVENTION

The object of the present invention is to carry out the update of meteorological information for an aircraft that makes it possible to have the information ready for display and for use without waiting, to reduce and smooth the workload of the crew by anticipating the request and the processing and to limit the potential confusion associated with the receipt, hitherto verbal, of the ATIS information.

The method according to the invention is characterized in that an onboard computer automatically makes the request for the meteorological data so as to anticipate the updating of the latter as soon as an update is available.

According to one feature of the invention, the computer is that of at least one of the following elements: the FMS, an integrated surveillance system (ISS), an onboard information system (OIS) or EFB (Electronic Flight Bag) or else a dedicated meteorological computer.

According to another feature of the invention, the request for the meteorological data comprises the following steps: the computer lodges a request to update this data with the ground via an air-ground datalink, as soon as the data are received, it stores them in memory and, according to the data type, it verifies the pertinence of updating the existing data, it notifies the crew that the new data is available, the crew checks them before any use, it updates the forecasts and performance data affected by taking account of the new data, it displays these data on a specific interface, and it raises an alarm in the event of data compromising the accessibility of an airport. For example, concerning the wind and temperature data, the computer compares the numerical values and transmits the changes if they exceed a threshold.

Consequently, the method of the invention consists in automating the request for the meteorological data so as to anticipate the updating of the latter as soon as an update is available. Therefore, this automation allows the crew to have the data ready for display and for use without waiting, to reduce and smooth the workload of the crew by anticipating the request and processing of these data, and to limit potential confusion associated with the receipt, hitherto verbal, of the ATIS information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

FIG. 1 shows a block diagram illustrating the steps of updating meteorological information for an aircraft according to an embodiment of the present invention.

DETAILED DESCRIPTION OF THE INVENTION

The present invention will be better understood on reading the detailed description of an embodiment taken as a non-limiting example and described below.

In detail, the onboard computer, for example that of the FMS, scans the meteorological data recorded in the FMS ("Flight Management System") computer in order to determine its state and date. These data become null and void as soon as the point on the flight plan to which they apply is passed by the aircraft, or else when other fresher data may replace the old data. Furthermore, certain updates are useful only for making a choice, such as for example when the aircraft arrives at a decision point on the way to an alternative aerodrome, for which it must know the meteorological accessibility in advance.

In such cases, the FMS computer lodges a request to update these data with the ground (with the "Airline Operating Center", or the ATS or directly with a meteorological data supplier, as required) by air-ground datalink (step 1). On receipt of the required information, this computer stores it in the memory of the aforementioned onboard computer (step 2).

Depending on the type of data received, the FMS computer verifies the pertinence of the update of the data (step 3) and notifies the crew of the aircraft that the new data are available (step 4). The crew must then validate it before any use. This computer then updates the forecasts and performance data affected by taking account of these new data (step 5), displays these data on a specific interface (step 6) (such as an MCDU (Multifunction Control Display Unit) page, that is to say of the communication display) and it raises an alarm if data compromise the accessibility of an airport (minima not achieved for the destination or alternative airport).

The meteorological data required automatically according to the method of the invention are in particular:

1—the meteorological conditions on take-off (wind, temperature, QNH/QFE pressure, etc.) as supplied by the ATIS (QNH, namely Atmospheric pressure at mean sea level; QFE, namely, atmospheric pressure at sea level, corrected for temperature and adjusted to a specified datum such as airfield elevation, when set on the altimeter it reads height), 2—the wind (at several levels), the temperature and the tropopause on the remaining points of the trajectory to the destination, and on the alternative route of the active flight plan, 3—the meteorological conditions of the alternative airfields (wind, temperature, QNH/QFE pressure, ceiling, horizontal visibility or RVR (Runway Visual Range)) as available via ATIS, METAR (METAR is a format for reporting weather information. A METAR weather report is predominantly used by pilots in fulfillment of a part of a pre-flight weather briefing, and by meteorologists, who use aggregated METAR information to assist in weather forecasting.) or TAF (TAF is a specially encoded weather forecast.) messages, 4—the meteorological conditions of the destination (as in 3).

The data 1), 3) and 4) affect the take-off and landing performance and are used essentially for guidance, except QNH (Atmospheric pressure at mean sea level) and temperature which can be used for computing the trajectory. The data 2) are used throughout the flight.

These requests are made at least in the following conditions:

pre-flight, as soon as a destination and a flight plan exist for all the data 1), 2), 3) and 4)

in all the flight phases for the data 2) with a frequency that depends on capabilities and the need (for example, every 30 minutes and on every sequencing of the waypoints, that is to say the points of passage of the aircraft trajectory), every ½ hour in cruise for the data 2), 3) and 4)

In addition, as for the meteorology at the destination (equivalent to METAR/TAF), along the route (winds and temperature) and for alternatives (METAR/ATIS), it must be obtained:

in flight before the sequencing of each decision point associated with an alternative airport, and in flight before beginning descent in order to know the minima at the destination (ATIS).

In the circumstances mentioned above, the system automatically issues a "downlink" request for:

TWIP or "Terminal Weather Information for Pilots" (MFI label AB label) whose report is generated in response to a downlink TWIP request, ATIS ("Automated Terminal Information Service") (5D label), these requests being defined by the ARINC 620 standard, supplement 3, and making it possible to retrieve the meteorological data (including winds and temperature).

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A method of updating meteorological information for an aircraft, said method comprising:
    automatically and periodically requesting meteorological data by an onboard computer to anticipate an update as soon as the update is available,
    wherein the request for meteorological data comprises the steps:
        providing a request by the computer to update the meteorological data with a ground via an air-ground datalink,
        storing the meteorological data in memory as soon as the data are received,
        verifying a pertinence of updating existing data according to the stored data when new data are different from the stored data,
        raising an alarm if the new data compromise the accessibility of a destination airport or an alternative airport,
        notifying a crew that the new data is available for checking and validating before use by the onboard computer,
        updating forecasts and performance data affected by taking account of the new data, and
        displaying the forecasts and performance data on a specific interface.

2. The method according to claim 1, wherein the computer is at least one of a flight management system (FMS), an integrated surveillance system (ISS), an onboard information system (OIS), an electronic flight bag (EFB), or a dedicated meteorological computer.

3. The method according to claim 1, wherein the requested meteorological data includes
    meteorological conditions on take-off,
    wind at several levels, temperature and tropopause on remaining points of a trajectory to a destination, and on an alternative route of an active flight plan,
    meteorological conditions of alternative airfields, and
    meteorological conditions of the destination.

4. The method according to claim 1, wherein the requested meteorological data includes
    (i) meteorological conditions on take-off;
    (ii) wind at several levels, temperature and tropopause on remaining points of a trajectory to a destination, and on an alternative route of an active flight plan;
    (iii) meteorological conditions of alternative airfields; and
    (iv) meteorological conditions of the destination,
    wherein the request is made at least in the following conditions:
        pre-flight, as soon as a destination and a flight plan exist for all the data (i), (ii), (iii) and (iv);
        in all flight phases for the data (ii) with a frequency that depends on capabilities and the need; and
        every ½ hour in cruise for the data (ii), (iii) and (iv).

* * * * *